US012586512B2

(12) United States Patent
Kim et al.

(10) Patent No.: US 12,586,512 B2
(45) Date of Patent: Mar. 24, 2026

(54) DISPLAY APPARATUS INCLUDING LED DRIVING CIRCUIT AND OPERATING METHOD THEREOF

(71) Applicant: SAMSUNG ELECTRONICS CO., LTD., Suwon-si (KR)

(72) Inventors: Sungsoo Kim, Suwon-si (KR); Jinho Kim, Suwon-si (KR); Donggun Oh, Suwon-si (KR); Hoseop Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/215,554

(22) Filed: Jun. 28, 2023

(65) Prior Publication Data

US 2024/0062706 A1 Feb. 22, 2024

Related U.S. Application Data

(63) Continuation of application No. PCT/KR2023/006204, filed on May 8, 2023.

(30) Foreign Application Priority Data

Aug. 17, 2022 (KR) ........................ 10-2022-0102843

(51) Int. Cl.
*G09G 3/32* (2016.01)
*G09G 3/20* (2006.01)

(52) U.S. Cl.
CPC ............. *G09G 3/32* (2013.01); *G09G 3/2003* (2013.01); *G09G 3/2011* (2013.01);
(Continued)

(58) Field of Classification Search
CPC .................................................. G09G 2340/16
See application file for complete search history.

(56) References Cited

U.S. PATENT DOCUMENTS 8,633,660 B2 1/2014 Cho et al.
9,101,023 B2 8/2015 Ota
(Continued)

FOREIGN PATENT DOCUMENTS

CN 105430791 A 3/2016
CN 113068289 A 7/2021
(Continued)

OTHER PUBLICATIONS

International Search Report and Written Opinion (PCT/ISA/210 and PCT/ISA/237) dated Aug. 23, 2023, issued by International Searching Authority for International Application No. PCT/KR2023/006204.

(Continued)

*Primary Examiner* — Bipin Gyawali
(74) *Attorney, Agent, or Firm* — Sughrue Mion, PLLC

(57) ABSTRACT

A display apparatus is disclosed. The display apparatus includes a plurality of light emitting devices forming a plurality of sub pixels of a display panel, an LED driving circuit which receives a PWM signal, and drives the plurality of light emitting devices based on the input PWM signal, at least one memory configured to store grayscale information of a previous frame, and at least one processor configured to generate, based on grayscale information of a current frame being input, a PWM signal based on the grayscale information of the current frame and the stored grayscale information of the previous frame, and provide the generated PWM signal to the LED driving circuit.

13 Claims, 10 Drawing Sheets

(52) U.S. Cl.
CPC ............... *G09G 2320/0233* (2013.01); *G09G 2320/0285* (2013.01); *G09G 2340/16* (2013.01)

(56) References Cited

U.S. PATENT DOCUMENTS

| | | | | |
|---|---|---|---|---|
| 9,165,504 | B2 | 10/2015 | Ha | |
| 9,847,066 | B2 | 12/2017 | Cho | |
| 10,078,985 | B2 | 9/2018 | Mori | |
| 10,395,596 | B2 * | 8/2019 | Jang | G09G 3/3291 |
| 10,431,138 | B2 | 10/2019 | Cho et al. | |
| 10,713,994 | B2 | 7/2020 | Cho et al. | |
| 10,825,377 | B2 | 11/2020 | Lee et al. | |
| 11,308,847 | B2 | 4/2022 | Cho et al. | |
| 11,423,829 | B2 * | 8/2022 | Choi | G09G 3/32 |
| 11,514,842 | B2 | 11/2022 | Jung et al. | |
| 2009/0096741 | A1 * | 4/2009 | Kim | G09G 3/342 345/102 |
| 2009/0243986 | A1 * | 10/2009 | Jung | G09G 3/3406 345/94 |
| 2012/0207205 | A1 * | 8/2012 | Zhao | G09G 3/3406 375/238 |
| 2013/0321254 | A1 * | 12/2013 | Kim | G09G 3/3406 345/102 |
| 2015/0371594 | A1 * | 12/2015 | Huang | G09G 3/003 345/102 |
| 2016/0078830 | A1 * | 3/2016 | Huang | G09G 3/3406 345/691 |
| 2016/0140916 | A1 * | 5/2016 | Cho | G09G 3/3648 345/691 |
| 2016/0180761 | A1 * | 6/2016 | Sasaki | G09G 3/36 345/88 |
| 2016/0358557 | A1 | 12/2016 | Mori | |
| 2018/0061298 | A1 | 3/2018 | Cho et al. | |
| 2018/0145116 | A1 | 5/2018 | Lee et al. | |
| 2018/0197453 | A1 * | 7/2018 | Lee | G09G 3/32 |
| 2018/0240399 | A1 | 8/2018 | Lin et al. | |
| 2019/0058481 | A1 * | 2/2019 | Gao | H03L 7/0992 |
| 2019/0333447 | A1 * | 10/2019 | Yang | G09G 3/3266 |
| 2019/0392750 | A1 | 12/2019 | Cho et al. | |
| 2020/0193910 | A1 * | 6/2020 | Park | G09G 3/3266 |
| 2020/0302852 | A1 | 9/2020 | Cho et al. | |
| 2021/0241682 | A1 | 8/2021 | Jung et al. | |
| 2021/0264833 | A1 * | 8/2021 | Heo | G09G 3/006 |
| 2021/0398494 | A1 | 12/2021 | Kwon et al. | |
| 2022/0293039 | A1 | 9/2022 | Li | |
| 2022/0383805 | A1 * | 12/2022 | Lee | G09G 3/3233 |
| 2023/0274683 | A1 | 8/2023 | Mase | |

FOREIGN PATENT DOCUMENTS

| | | | |
|---|---|---|---|
| CN | 114241980 | A | 3/2022 |
| JP | 2017-3699 | A | 1/2017 |
| KR | 10-0181399 | B1 | 5/1999 |
| KR | 10-0543271 | B1 | 1/2006 |
| KR | 10-1029181 | B1 | 4/2011 |
| KR | 10-2016-0058361 | A | 5/2016 |
| KR | 10-2018-0023704 | A | 3/2018 |
| KR | 10-2018-0082087 | A | 7/2018 |
| KR | 10-1948128 | B1 | 2/2019 |
| KR | 10-1984959 | B1 | 6/2019 |
| KR | 10-2171718 | B1 | 10/2020 |
| KR | 10-2021-0063653 | A | 6/2021 |
| KR | 10-2021-0099973 | A | 8/2021 |
| WO | 2022/030133 | A1 | 2/2022 |

OTHER PUBLICATIONS

Communication issued May 21, 2025 by the European Patent Office in European Patent Application No. 23854971.1.

Communication dated Sep. 5, 2025, issued by the Korean Patent Office in Korean Application No. 10-2022-0102843.

* cited by examiner

FIG. 9

| Post \ Pre | 0 | 16 | 32 | 64 | 128 | 256 |
|---|---|---|---|---|---|---|
| 0 | 0 | 0 | 0 | 0 | 0 | 0 |
| 16 | 32 | 16 | 8 | 8 | 8 | 8 |
| 32 | 64 | 64 | 32 | 16 | 16 | 16 |
| 64 | 128 | 128 | 128 | 64 | 32 | 32 |
| 128 | 256 | 256 | 256 | 256 | 128 | 64 |
| 256 | 512 | 512 | 512 | 512 | 512 | 256 |

DISPLAY APPARATUS INCLUDING LED DRIVING CIRCUIT AND OPERATING METHOD THEREOF

CROSS-REFERENCE TO RELATED APPLICATION(S)

This application is a continuation application, claiming priority under § 365(c), of an International application No. PCT/KR2023/0006204, filed on May 8, 2023, which is based on and claims the benefit of a Korean patent application number 10-2022-0102843, filed on Aug. 17, 2022, in the Korean Intellectual Property Office, the disclosure of each of which is incorporated by reference herein in its entirety.

BACKGROUND

1. Field

The disclosure relates to a display apparatus including LED driving circuits and an operating method thereof, and more particularly, to a display apparatus controlling LED driving circuits by generating a pulse width modulation (PWM) signal based on previous grayscale information and current grayscale information, and an operating method thereof.

2. Description of the Related Art

Methods for adjusting a grayscale of a light emitting device within a display panel have been used. For example, pulse amplitude modulation (PAM) method that represents a grayscale using a difference in voltage that is applied to a light emitting device, and/or a pulse width modulation (PWM) method that represents a grayscale using a difference in time at which voltage is applied to a light emitting device, have been used.

When a plurality of light emitting devices formed of a plurality of rows is driven in the PWM method, PWM data may be input to a plurality of LED driving circuits corresponding respectively to a plurality of light emitting devices, and the plurality of light emitting devices may be driven based on the input PWM data.

SUMMARY

According to an embodiment, a display apparatus includes a plurality of light emitting devices forming a plurality of sub pixels of a display panel, an LED driving circuit which receives a pulse width modulation (PWM) signal, and drives the plurality of light emitting devices based on the input PWM signal, at least one memory configured to store grayscale information of a previous frame, and at least one processor configured to generate a PWM signal, and provide the generated PWM signal to the LED driving circuit.

The at least one processor may be configured to generate, based on grayscale information of a current frame being input, a PWM signal based on the grayscale information of the current frame and the stored grayscale information of the previous frame.

According to an embodiment, an operating method of a display apparatus including a plurality of light emitting devices that form a plurality of sub pixels, the method of which includes storing grayscale information of a previous frame, generating a pulse width modulation (PWM) signal, and driving the plurality of light emitting devices based on the PWM signal. The generating the PWM signal includes generating, based on grayscale information of a current frame being input, a PWM signal based on the grayscale information of the current frame and the stored grayscale information of the previous frame.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is an example illustrating a look-up table, according to one or more embodiments.

DETAILED DESCRIPTION

In describing embodiments, if detailed descriptions of related known technologies may be unnecessarily confusing, the detailed description thereof may be omitted. In addition, redundant descriptions of same configurations may be omitted.

Terms used in the disclosure have been used to describe one or more embodiments, and are not intended to limit the disclosure. A singular expression includes a plural expression, unless otherwise specified.

In the disclosure, it is to be understood that the terms such as "have" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions such as "first," "second," "1st," "2nd," and so on used herein may be used to refer to various elements regardless of order and/or importance, and it should be noted that the expressions are merely used to distinguish an element from another element and not to limit the relevant elements.

Expressions such as "at least one of," when preceding a list of elements, modify the entire list of elements and do not modify the individual elements of the list. For example, the expressions, "at least one of a, b, and c," or "at least one of a, b, or c," should be understood as including only a, only b, only c, both a and b, both a and c, both b and c, or all of a, b, and c.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element). On the other hand, when a certain element (e.g., first element) is indicated as "directly coupled with/to" or "directly connected to" another element (e.g., second element), it may be understood as the other element (e.g., third element) not being present between the certain element and the another element.

The terms used in one or more embodiments of the disclosure may be interpreted to have meanings generally understood to one of ordinary skill in the art unless otherwise defined.

Various embodiments of the disclosure will be described in detail below with reference to the accompanied drawings.

Figure 1:
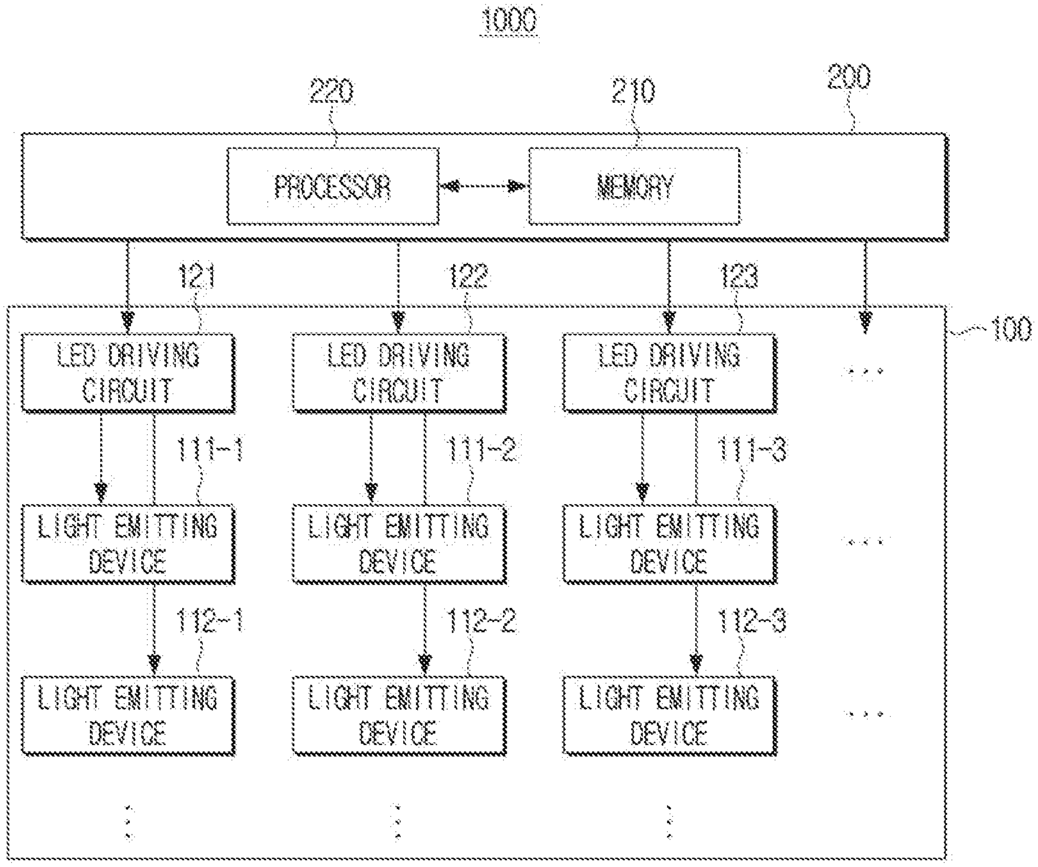
FIG. 1 is a block diagram illustrating a function of a display apparatus according to one or more embodiments.

FIG. 1 is a block diagram illustrating a function of a display apparatus according to one or more embodiments.

A display apparatus 1000 may be a terminal device such as, for example, and without limitation, a television (TV), a monitor, a smartphone, a notebook personal computer (PC), a tablet PC, a desktop PC, and the like, a wearable device such as a smartwatch, or the like, but is not limited thereto, and may be a display apparatus according to the disclosure so long as it is an apparatus that displays an image using the plurality of light emitting devices.

Referring to FIG. 1, the display apparatus 1000 may include a display panel 100 and a driver 200.

The display panel 100 may include a plurality of light emitting devices 111-1, 111-2, 111-3, . . . , 112-1, 112-2, 112-3, . . . that form a plurality of sub pixels and a plurality of LED driving circuits 121, 122, 123, . . . . Detailed configuration and operations of the display panel 100 will be described below with reference to FIG. 2.

The driver 200 may input various signals to the plurality of LED driving circuits 121, 122, 123, . . . included in the display panel 100. The driver 200 may include a memory 210 and a processor 220.

The memory 210 may store grayscale information of a previous frame. The grayscale information may be PWM pulse width information for driving a plurality of pixels, respectively, that are included in the display panel, or may be brightness information for the respective pixels (or sub pixels) included in the display panel. In the disclosure, although storing only the grayscale information of the previous frame has been described, storing not only the grayscale information of the previous frame, but also storing the grayscale information of previous two frames may be possible at implementation.

Further, the memory 210 may store a look-up table. The look-up table may be a table with information on a degree of compensation of current grayscale information according to a relationship between the previous grayscale information and the current grayscale information. For example, it may be a table in which a compensated grayscale value includes a grayscale value that is lower than a current grayscale value if the previous grayscale value is a high grayscale value, and the current grayscale value is a grayscale value that is lower than the high grayscale value, and in which the compensated grayscale value includes a value higher than the current grayscale value if the previous grayscale value is a low grayscale value and the current grayscale value is a high grayscale value that is higher than the previous grayscale value. Further, the grayscale information may be information corresponding to a degree of brightness of a light emitting device, and may be a pulse width (or duty) corresponding to a PWM signal, or may be a brightness value of a pixel.

The memory 210 may store a plurality of look-up tables divided for each image mode, and the processor 220 which will be described below may use the look-up table corresponding to the image mode. In addition, the memory 210 may store the plurality of look-up tables according to a position of the light emitting device within a block.

The memory 210 as described may be implemented into various forms such as, for example, and without limitation, a random access memory (RAM) or a flash memory, a hard disk drive (HDD), an external memory, a memory card, and the like, and is not limited to any one.

The processor 220 may generate a PWM signal based on the grayscale information of the current frame and the grayscale information of the previous frame stored in the memory 210 when the grayscale information of the current frame is input. Specifically, the processor 220 may compensate the grayscale information corresponding to the current frame based on the grayscale information stored in the memory 210.

For example, if the memory 210 stores pulse width information corresponding to the PWM signal, and receives image data of an R/G/B component, the processor 220 may check a PWM pulse width of the current frame and a specific light emitting device, and determine whether compensation of the pulse width information of the current frame is necessary by comparing the pulse width information of a corresponding light emitting device pre-stored in the memory 210 with the pulse width information of the current frame.

Further, the processor 220 may compensate, based on compensation being necessary, the pulse width of the current frame by taking into reference the pulse width of the previous frame. The determination on whether compensation is necessary and the compensation as described may be performed by using a look-up table or an equation. In addition, the above-described determination and compensation may be performed in one step. For example, compensation may be performed without an operation of determining whether compensation is necessary.

Determining whether a specific compensation is necessary and a compensation operation in the processor 220 will be described below with reference to FIG. 4 to FIG. 9.

Further, the processor 220 may provide the generated PWM signal to the LED driving circuits.

Further, the driver 200 may further include not only the above-described memory 210 and the processor 220, but also a timing controller, a data driving part, a gate driving part, and the like.

The timing controller may generate an image data signal, a scanning control signal, a data control signal, an emission control signal, and the like by receiving input of an input signal (IS), a horizontal synchronous signal (Hsync), a vertical synchronous signal (Vsync), a main clock signal (MCLK), and the like from the outside and provide the same to the display panel 100, the data driving part, the gate driving part, and the like.

Specifically, the timing controller may apply at least one from among the various signals (Emi, Vsweep, Vini, VST, Test/Discharging) to the plurality of LED driving circuits 121, 122, 123, . . . . In addition, the timing controller may apply a control signal (MUX Sel R, G, B) for selecting one sub pixel from among R, G, B sub pixels to the plurality of LED driving circuits 121, 122, 123, . . . .

The data driving part (or source driver, data driver) may receive, as a means for generating a data signal, image data and the like of the R/G/B component and generate data voltage (e.g., a PWM data voltage, a PAM data voltage).

The above-described processor 220 may function as the data driving part at implementation, and/or perform a function of directly compensating the data voltage generated from the data driving part based on the grayscale information as a separate configuration from the data driving part.

For example, to perform a function according to the disclosure, a data driving part of the related art and the processor according to the disclosure may be combined and implemented, or the processor may be implemented to perform a function of the data driving part of the related art together therewith. If implemented in a first form, the processor 220 may compensate the PWM signal generated from the data driving part through the above-described operation, and provide the compensated PWM signal to the LED driving circuit.

If implemented in a second form, the processor 220 may receive image data and the like of the R/G/B component, generate a PWM signal based on the grayscale information of the previous frame and the grayscale information corresponding to the current frame, and provide the generated PWM signal to the LED driving circuit.

The gate driving part (or, gate driver) may be a means for generating various control signals such as SPWM(n) and SPAM. The gate driving part may input the generated various control signals to the LED driving circuits that correspond to a specific row (or, specific horizontal line) from among the plurality of pixels on the display panel 100, but is not limited thereto.

The gate driving part may apply driving voltage (VDD) to a driving voltage terminal of the LED driving circuit according to one or more embodiments.

The data driving part and the gate driving part may be implemented such that a whole or a part thereof is included in a thin film transistor (TFT) layer formed at one surface of a glass of the display panel 100 or implemented as a separate semiconductor IC and disposed at an opposite surface of the glass.

According to one or more embodiments, a display wall which includes the above-described display panel in plurality may also be implemented. On the display wall, a light emitting period for each group of the LED driving circuits included in one display panel may be designed so as to not overlap with the light emitting periods for each group of the LED driving circuits included in another display panel, respectively.

In an example, a first display panel driving light emitting devices of a first group and a second group by each group, and a second display panel driving light emitting devices of a third group and a fourth group by each group may be assumed.

In this case, a light emitting period of the third group included in the second display panel may be started after a time point at which a light emitting period of the first group included in the first display panel is ended. In addition, a light emitting period of the second group included in the first display panel may be started after a time point at which the light emitting period of the third group included in the second display panel is ended. In addition, a light emitting period of the fourth group included in the second display panel may be started after a time point at which the light emitting period of the second group included in the first display panel is ended.

The display apparatus 1000 according to the disclosure as described above may compensate for a change in image brightness according to a distortion of the PWM signal that is generated by an RC component in the LED driving circuit for LED driving.

In FIG. 1, for convenience of description, although the grayscale information of the current frame being compensated using a relationship between the grayscale information of the previous frame and the grayscale information of the current frame has been described, compensating the grayscale information of the current frame by using the grayscale information of the current frame may also be possible at implementation. For example, when sequentially driving the plurality of light emitting devices for one pixel, that is, when a brightness value of a pixel is expressed by performing a light emitting operation in an order of an R device, a G device, and a B device, the grayscale information for the G device may be compensated by using the grayscale information of the R device when implementing the G device, and the grayscale information for the B device may be compensated by using the grayscale information of the G device when implementing the B device.

Figure 2:
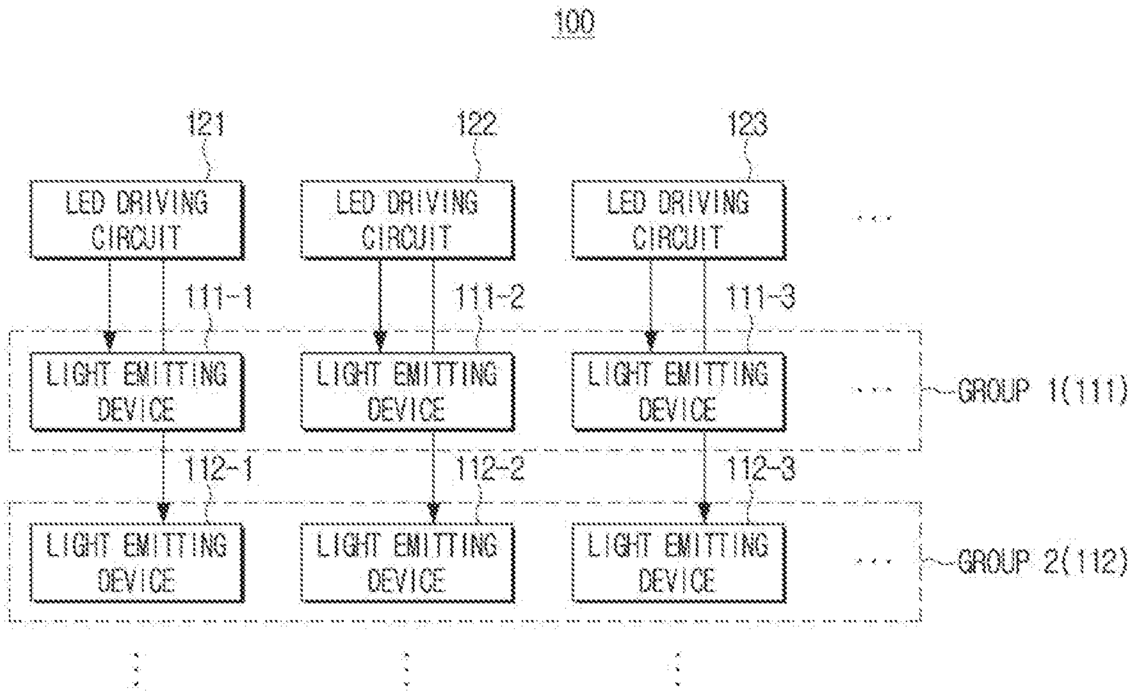
FIG. 2 is a block diagram illustrating a function of a display panel according to one or more embodiments.

FIG. 2 is a block diagram illustrating a function of a display panel according to one or more embodiments.

Referring to FIG. 1, according to an embodiment, the light emitting device based display panel 100 may include the plurality of light emitting devices 111-1, 111-2, 111-3, . . . , 112-1, 112-2, 112-3, . . . that form the plurality of sub pixels and the plurality of LED driving circuits 121, 122, 123, . . . .

The plurality of LED driving circuits may be circuits for driving one or more light emitting devices, respectively. The plurality of LED driving circuits may be included in a circuit layer (e.g., thin film transistor (TFT)) formed on a substrate of a display panel. In this case, the substrate may be implemented as, for example, a glass.

Each light emitting device may be an inorganic light emitting device that form one sub pixel.

In an example, when the light emitting device is implemented as a micro LED, the light emitting device may form a sub pixel that outputs light of any one from among red, green, or blue. In this case, the light emitting devices that correspond to each of the red, green, and blue may form one pixel. That is, one pixel may be formed of a red micro LED that outputs light of a red color, a green micro LED that outputs light of a green color, and a blue micro LED that outputs light of a blue color.

The display panel 100 may be formed of a plurality of pixels, and the plurality of pixels may be arranged in matrix form in the display panel 100. At this time, a number of pixels may be determined according to a resolution. For example, a display panel of a display apparatus that shows an 8K resolution in a 16:9 ratio may be formed of 7680×4320 pixels, and because one pixel is formed of three LEDs in the case of an inorganic light emitting device, the LED may need three 7680×4320 (7680×4320×3).

Referring to FIG. 2, the plurality of light emitting devices may be divided into a plurality of groups 111, 112, . . . . At this time, the light emitting devices that form the pixels positioned at a same row from among the plurality of pixels arranged in the matrix form may be divided as a same group. Alternatively, light emitting devices that form the pixels that are positioned in a checker board form from among the plurality of pixels arranged in the matrix form may be divided as a same group.

The plurality of LED driving circuits 121, 122, 123, . . . may receive PWM data voltage from a scanning period.

Further, the plurality of LED driving circuits 121, 122, 123, . . . may drive the plurality of light emitting devices by providing driving current to the plurality of light emitting devices for a time corresponding to the input PWM data voltage in a light emitting period.

Referring to FIG. 2, the plurality of LED driving circuits may be respectively connected with the light emitting devices that are included in different groups from one another from among the plurality of groups. Further, the respective LED driving circuits may drive the connected light emitting devices on a group basis.

Specifically, the plurality of LED driving circuits may divide and drive the plurality of groups by driving the light emitting devices included in the respective groups through the scanning period and the light emitting period for the respective groups.

At this time, the plurality of LED driving circuits may drive the plurality of groups in a time-division manner. That is, the light emitting periods at which the respective groups are driven may be divided respectively.

An LED driving circuit 121 may be connected with a light emitting device 111-1 included in group 1 111 and a light emitting device 112-1 belonging to group 2 112, respectively. The LED driving circuit 121 may be respectively connected with the light emitting devices belonging to group 3, group 4, and the like. The LED driving circuit 121 may respectively drive the light emitting device 111-1 and the light emitting device 112-1 sequentially (time-division).

An LED driving circuit 122 may also be connected with a light emitting device 111-2 included in group 1 111 and a light emitting device 112-2 belonging to group 2 112, respectively. Then, the LED driving circuit 122 may respectively divide and drive the light emitting device 111-2 and the light emitting device 112-2.

At this time, while the LED driving circuit 121 drives the light emitting device 111-1 included in group 1 111, the LED driving circuit 122 may also drive the light emitting device 111-2 included in group 1 111.

In addition, while the LED driving circuit 121 drives the light emitting device 112-1 included in group 2 112, the LED driving circuit 122 may also drive the light emitting device 112-2 included in group 2 112.

Figure 3:
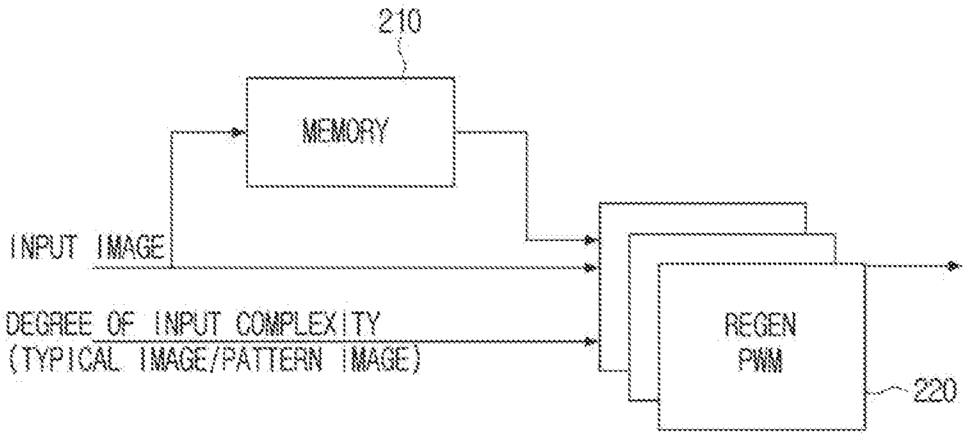
FIG. 3 is a diagram illustrating a function of a driver, according to one or more embodiments.

FIG. 3 is a diagram illustrating a function of a driver in FIG. 1, according to an embodiment.

Referring to FIG. 3, the driver 200 may include the memory 210 and the processor 220.

According to an embodiment, the memory 210 may store information about an input image corresponding to the previous frame. The information about the input image may be brightness information, or pulse width information corresponding to a PWM signal.

The processor 220 may generate a PWM signal by comparing an input image corresponding to the current frame and an input image corresponding to the previous frame. At this time, the processor 220 may determine a corresponding compensation method from among various compensation methods (or plurality of look-up tables) based on complexity of the input image or an image mode, and perform a compensation based therefrom.

The compensation of the processor 220 may use a calculation method, or a method of using a look-up table. For example, in case of a panel (or display apparatus) in which a change in brightness is linearly deformed, a compensation operation may be performed by using the calculation method. In an example, using an equation such as $(N-2)*C+(N-1)*A+(N)*B$ (N represents a frame number, N represents a current frame, N−1 represents a previous frame, N−2 represents a frame ahead by 1 frame than N−1 frame, and C, A, and B represent a constant (or weight value)), a pulse width to be provided to a corresponding light emitting device or a brightness value may be calculated. The constant or weight value referred herein may be calculated through an experiment of a corresponding panel, and may be variably set according to a position within a block formed by the panel or the plurality of light emitting devices or a characteristic of an image (move/standard/Dynamic).

Alternatively, when the change in brightness includes a non-linear (e.g., a log or an index with respect to a change in the PWM pulse width) change characteristic, calculating the compensation value by using the look-up table may be possible. Examples of the look-up table will be described below with reference to FIG. 9.

Figure 4:
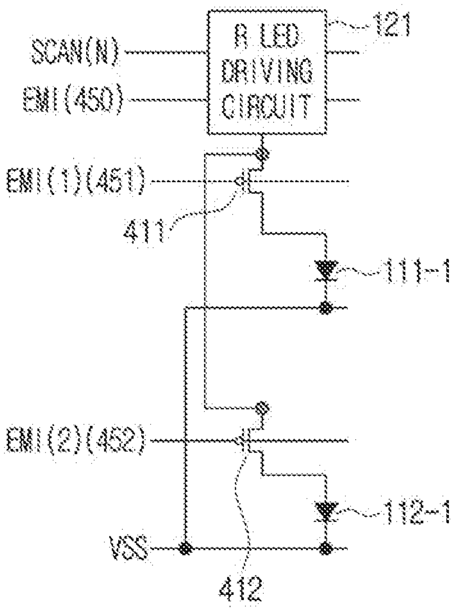
FIG. 4 is a circuit diagram illustrating a connection relationship between an LED driving circuit and light emitting devices that are included in a display panel, according to one or more embodiments.

FIG. 4 is a circuit diagram illustrating a connection relationship between an LED driving circuit and light emitting devices that are included in a display panel according to one or more embodiments. Specifically, FIG. 4 shows an example illustrating the LED driving circuit 121 connected with the respective light emitting devices 111-1 and 112-1 that form the red sub pixels which are respectively included in two different pixels.

Referring to FIG. 4, the LED driving circuit 121 may be connected with a first transistor 411 which is included in group 1 111 and connected with the light emitting device 111-1 that is driven by the LED driving circuit 121, a second transistor 412 which is included in group 2 112 and connected with the light emitting device 112-1 that is driven by the LED driving circuit 121, and the like.

The LED driving circuit 121 may apply current to the first transistor 411 or the second transistor 412 according to a common control signal (Emi(450)).

Specifically, the LED driving circuit 121 may apply current to the first transistor 411 or the second transistor 412 during the light emitting period at which the common control signal (Emi(450)) is applied.

At this time, the first transistor 411 may be switched according to a first control signal (Emi(1)(451)), and the second transistor 412 may be switched according to a second control signal (Emi(2)(452)). The first control signal (Emi(1)(451)) may turn-on the first transistor 411 during a light emitting period 461 of group 1 111 for the current to be applied to the light emitting device 111-1 from the LED driving circuit 121. In addition, the second control signal (Emi(2)(452)) may turn-on the second transistor 412 during a light emitting period 462 of group 2 112 for the current to be applied to the light emitting device 112-1 from the LED driving circuit 121.

Then, the LED driving circuit 121 may provide, based on a first PWM data voltage input from a scanning period of group 1 111, driving current to the light emitting device 111-1 included in group 1 111 through the first transistor 411 which is turned-on according to the first control signal (Emi(1)) during the light emitting period 461 of group 1 111.

In addition, the LED driving circuit 121 may provide, based on a second PWM data voltage input from a scanning period of group 2 112, driving current to the light emitting device 112-1 included in group 2 112 through the second transistor 412 which is turned-on according to the second control signal (Emi(2)) during the light emitting period 462 of group 2 112.

The connection relationship between the LED driving circuit and the light emitting devices as described may be commonly applied to even between the plurality of light emitting devices as shown in FIG. 1 or FIG. 2, and the plurality of light emitting devices may be driven on a group basis at implementation. An operation when block driving will be described in detail below with reference to FIG. 5.

Figure 5:
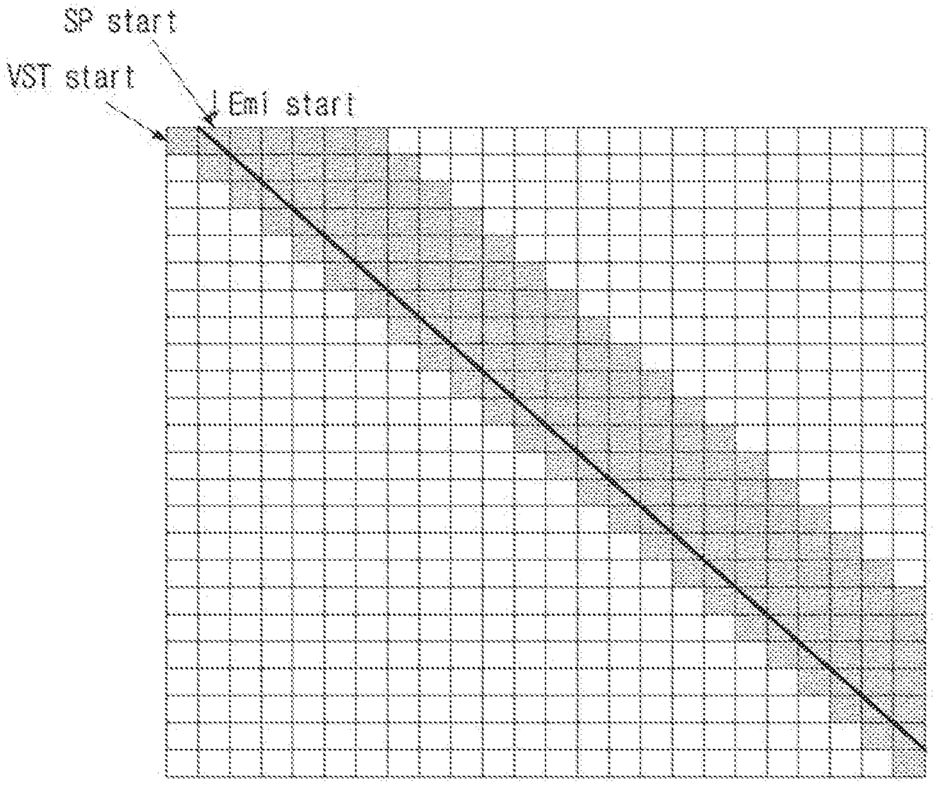
FIG. 5 is an example illustrating a block driving, according to one or more embodiments.
Figure 6:
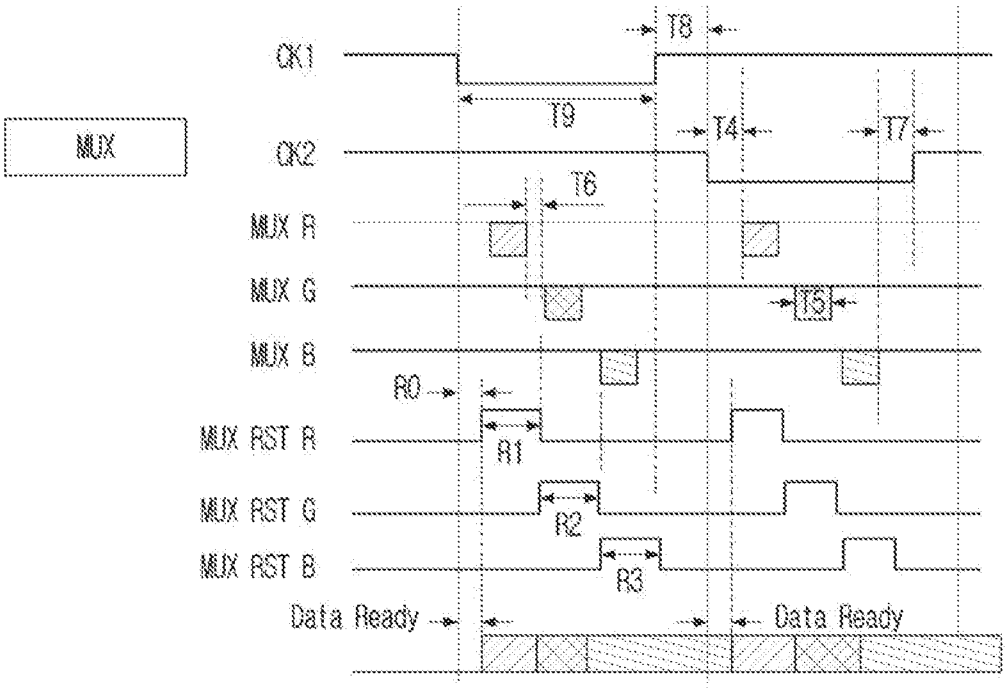
FIG. 6 is an example illustrating an operation of a plurality of light emitting devices, according to one or more embodiments.

FIG. 5 is an example illustrating a block driving according to one or more embodiments, and FIG. 6 is an example illustrating an operation of a plurality of light emitting devices according to one or more embodiments.

Referring to FIG. 5 and FIG. 6, a display panel that displays an image with the plurality of light emitting devices may be configured such that the plurality of light emitting devices emit light corresponding to one pixel for one pixel. Each light emitting device that form the one pixel described above may be referred to as a sub pixel.

Since LED driving circuits corresponding to the number of light emitting devices may be required to simultaneously drive a plurality of light emitting devices in the display panel, one LED driving circuit may be controlled to emit the plurality of light emitting devices sequentially in a scan driving method.

With recent increases in image resolution, a number of pixels forming an image have grown, and much time is spent driving all pixels sequentially. Accordingly, the plurality of light emitting devices may be divided into a number of rows and blocks of a column unit, and an operation in the above-described scan driving method may be performed on a divided block basis. A compensation operation is described below based on an assumption of driving on a block basis, but the compensation operation may be performed even when operation is not carried out on a block basis at implementation.

Referring to FIG. 5, an image display operation within a block unit formed of the plurality of light emitting devices is described, but only the light emitting devices forming one block has been shown for convenience in the drawing. Accordingly, a panel may be included with a plurality of blocks as shown in FIG. 5 at implementation.

When one block is formed of a plurality of columns and a plurality of rows, an operation may be sequentially performed from the first column according to a VST signal. When a common control signal(Emi) is input for each column, a PWM signal corresponding to a grayscale value in the corresponding light emitting device may be input for the respective light emitting devices to which the corresponding common control signal is input.

As described above, because the plurality of light emitting devices perform an operation simultaneously when block driving with respect to a plurality of LED devices, the first light emitting device of block driving and the light emitting device positioned at a last line may vary in waveform type that is input to each light emitting device at an actual operation even if a same low grayscale value is input. A waveform of a last line signal compared to a waveform corresponding to a first line signal of a first block may be a wave type rather than a square waveform due to transition by the RC being slow. The types described above will be described below with reference to FIG. 7.

Figure 7:
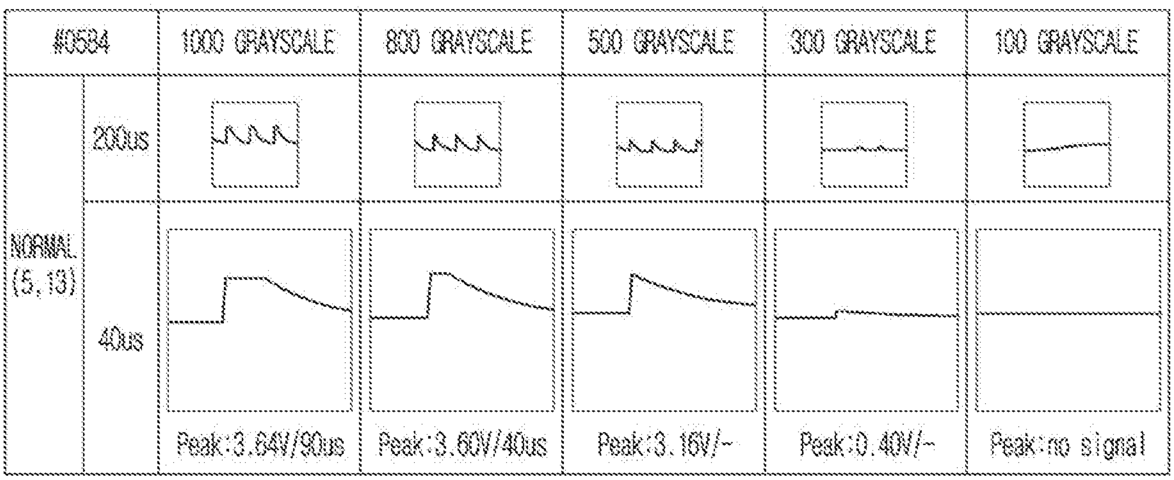
FIG. 7 is an example illustrating an output waveform for each grayscale that is output to a light emitting device, according to one or more embodiments.

FIG. 7 is an example illustrating an output waveform for each grayscale that is output to a light emitting device.

FIG. 7 shows an example illustrating a waveform that is output to a light emitting device for the plurality of grayscale values and for each temporal axis.

Referring to FIG. 7, even if a square type waveform is generated and input to a light emitting circuit, the waveform that is input to the light emitting device as shown having a significantly distorted type rather than the square type may be verified. Specifically, the distortion of waveform described above may be affected by the temporal axis (an N−1 frame or a sub frame), and may be affected by a spatial axis (waveform of a previous color when continuously inputting RGB).

As described above, if the grayscale value of the previous frame (or a grayscale value of another sub pixel that form a same pixel within the current frame) is a high grayscale value or a low grayscale value, a grayscale value of a following frame may include a higher brightness or a lower brightness than a grayscale value of an actually input corresponding pixel. Descriptions of both cases will be provided below with reference to FIG. 8.

Figure 8:
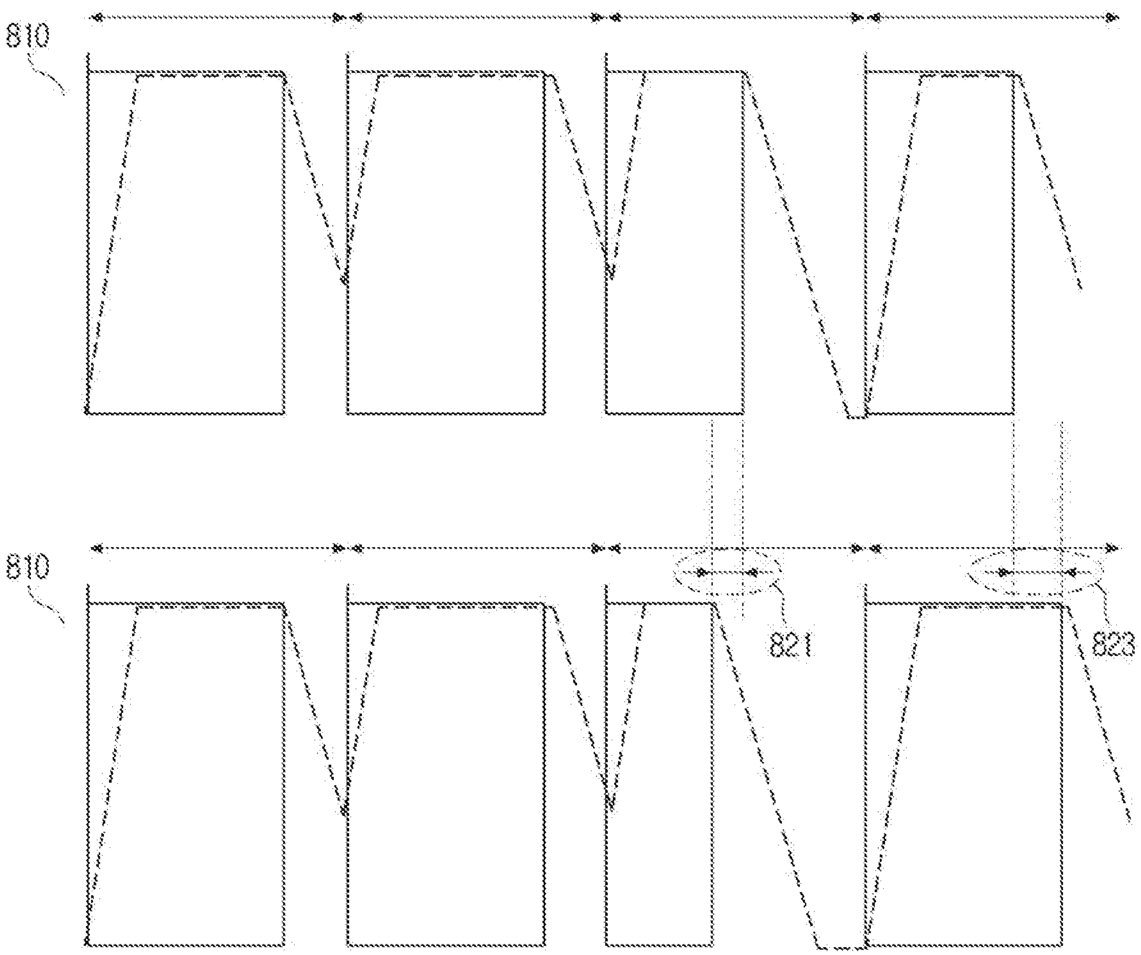
FIG. 8 is an example illustrating an output waveform before compensation and an output waveform after compensation, according to one or more embodiments.

FIG. 8 is an example illustrating an output waveform before compensation and an output waveform after compensation, according to one or more embodiments.

A distortion phenomenon of when the previous frame includes a high grayscale value, and a following frame includes a low grayscale value and operations of the disclosure to solve the above will be described.

A second pulse and a third pulse of a first waveform 810 are illustrated in FIG. 8. A straight line of the shown waveform may be a PWM signal generated by the driving circuit, and a dotted line may be a form of a signal that is input to an actual light emitting circuit affected by RC and the like.

If a pulse of the previous frame includes a high grayscale value, the light emitting device may perform a turn-on operation faster than a typical case because the PWM signal is raised prior to transitioning to a 0 value. That is, the light emitting device may be driven in a turned-on state longer than a duty time corresponding to an original grayscale value.

Accordingly, based on the previous frame including a high grayscale and a frame thereafter including a low grayscale value, the duty value may be compensated to include a lower duty value than the duty value (821) corresponding to the current frame. A degree of duty that is compensated at this time may be based on an actual measurement or an experiment value.

The distortion phenomenon of when the previous frame includes a low grayscale value and the frame thereafter includes a high grayscale value and the operation of the disclosure to solve the above will be described.

Specifically, a third pulse and a fourth pulse of the first waveform 810 are illustrated in FIG. 8.

If the pulse of the previous frame includes a low grayscale value, the light emitting device may be turned-on slower than in a typical case of the PWM signal in a fully converged state to a 0 value. That is, the light emitting device may be driven in a turned-on state shorter than the duty time corresponding to the original grayscale value.

Accordingly, the disclosure may compensate, based on the previous frame including a low grayscale and the frame thereafter including a high grayscale value, the duty value to include a longer duty value than the duty value (823) corresponding to the current frame. The degree of duty that is compensated at this time may be based on an actual measurement or an experiment value.

FIG. 9 is an example illustrating a look-up table according to one or more embodiments.

Referring to FIG. 9, the look-up table may store PWM information of the previous frame and the current frame, respectively. For example, when a brightness value of the previous frame is 128, and a current brightness value is 128, a separate compensation may not be performed.

Alternatively, when the brightness value of the previous frame is 128, and the brightness value of the current frame is 512, a compensation to include a wider pulse width than an original period may be performed.

Numbers of the look-up table shown in FIG. 9 may include numerical values that describe the operations of the look-up table, and may be more divided than the above-described scope in an actual implementation, and other values different from the corresponding value may be used.

Figure 10:
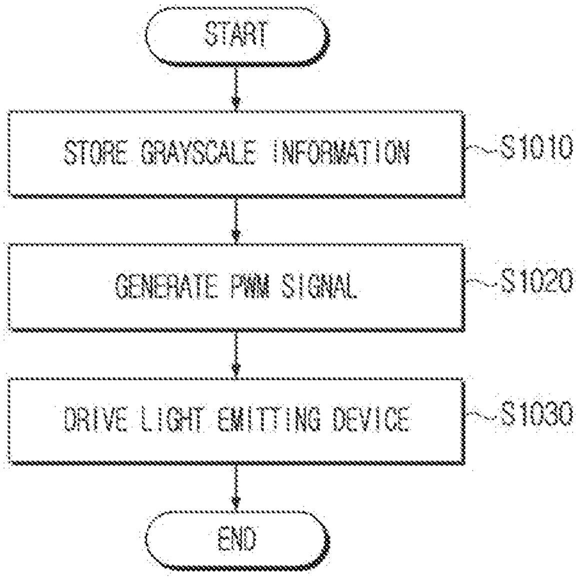
FIG. 10 is a flowchart illustrating an operating method of a display apparatus, according to one or more embodiments.

FIG. 10 is a flowchart illustrating an operating method of a display apparatus according to one or more embodiments.

Referring to FIG. 10, the grayscale information of the previous frame may be stored (S1010).

A PWM signal may be generated (S1020). If the grayscale information of the current frame is input, a PWM signal may be generated based on the grayscale information of the current frame and the stored grayscale information of the previous frame.

For example, based on the grayscale information being pulse width information that corresponds to the PWM signal, when the pulse width information of the current frame is input, the input pulse width information of the current frame may be compensated based on the stored pulse width information of the previous frame. In a more specific example, when a look-up table including a plurality of compensated pulse width values corresponding respectively to a plurality of previous pulse width values and a plurality of current pulse width values is used, the pulse width information may be compensated by verifying the pulse width information of the current frame and the compensated pulse widths corresponding to the stored pulse width information of the previous frame. Then, a PWM signal may be generated based on the compensated pulse width information.

If the grayscale information is brightness information of a sub pixel, the input brightness information of the current frame may be compensated based on the stored brightness information of the previous frame. Then, a PWM signal may be generated based on the compensated brightness information. In a more specific example, when a look-up table including a plurality of compensated brightness values corresponding respectively to a plurality of previous brightness values and a plurality of current brightness values is used, the brightness information may be compensated by checking the brightness information of the current frame and the compensated brightness value corresponding to the stored brightness information of the previous frame.

The plurality of light emitting devices may be driven based on the PWM signal (S1030).

The operating method described through FIG. 10 may be performed in the display apparatus of FIG. 1.

Respective elements according to the various embodiments described above may be formed of a single entity or a plurality of entities, and some sub-elements of the above-mentioned sub-elements may be omitted or other sub-elements may be further included in the various embodiments. Alternatively or additionally, some elements may be integrated into one entity to perform a same or similar functions performed by the respective corresponding elements prior to integration.

The computer instructions for performing processing operations in the device according to the various embodiments described above may be stored in a non-transitory computer-readable medium. The computer instructions stored in a non-transitory computer-readable medium may cause a specific device to perform a processing operation of the device according to the above-described various embodiments when executed by a processor of the specific device. The non-transitory computer-readable medium may refer to a medium that stores data semi-permanently rather than storing data for a very short time, such as a register, a cache, a memory, or the like, and is readable by a device. Examples of the non-transitory computer-readable medium may include, for example, and without limitation, a compact disc (CD), a digital versatile disc (DVD), a hard disc, a Blu-ray disc, a USB, a memory card, a ROM, and the like.

Operations performed by a module, a program, or other element, in accordance with various embodiments described above, may be executed sequentially, in parallel, repetitively, or in a heuristically manner, or at least some operations may be executed in a different order, omitted, or a different operation may be added.

While one or more embodiments have been illustrated and described with reference to various examples, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:

a plurality of light-emitting devices (LEDs) forming a plurality of sub pixels of a display panel;

an LED driving circuit;

at least one memory configured to store previous grayscale information of a previous frame; and at least one processor configured to:

determine, based on whether a change in brightness information is linearly deformed or includes a non-linear change characteristic, a compensation method from among a plurality of compensation methods comprises at least one of a calculation method or a look-up table method;

perform a compensation of grayscale information of a current frame based on the determined compensation method, wherein a pulse width modulation (PWM) signal is generated based on the compensated grayscale information;

based on the compensated grayscale information generate the PWM signal;

provide the generated PWM signal to the LED driving circuit, wherein the LED driving circuit is configured to receive the PWM signal from a scanning period, and drive the plurality of LEDs by providing driving current based on the received PWM signal to the plurality of LEDs in a light emitting period, wherein the grayscale information is the brightness information of a first sub pixel of the current frame and the brightness information does not include a second sub pixel of the current frame, and wherein the at least one processor is further configured to:

based on the brightness information of the first sub pixel of the current frame being received, compensate the received brightness information of the first sub pixel of the current frame based on a stored brightness information of the first sub pixel of the previous frame;

based on the first sub pixel of the previous frame having a lower grayscale value than a grayscale value of the first sub pixel of the current frame for each grayscale value of the first subpixel of the current frame comprising grayscale values of 16, 32, 64, 128, and 256, compensate the received brightness information to have a higher grayscale value than the grayscale value of the first subpixel of the current frame for each grayscale value of the first subpixel of the current frame, and provide a duty value of the current frame to be a longer duty value than the duty value of the previous frame.

2. The display apparatus of claim 1, wherein the grayscale information is pulse width information corresponding to the PWM signal, and wherein the at least one processor is further configured to:

based on pulse width information of the current frame being received, compensate the received pulse width information of the current frame based on the stored pulse width information of the previous frame; and generate the PWM signal based on the compensated pulse width information.

3. The display apparatus of claim 1, wherein the at least one processor is further configured to:

obtain a compensated grayscale value by providing the grayscale information of the current frame and the stored grayscale information of the previous frame to a pre-set equation that uses a previous grayscale value and a current grayscale value as variables; and generate the PWM signal based on the compensated grayscale value.

4. The display apparatus of claim 1, wherein the at least one processor is further configured to:

access a look-up table, the look-up table comprising a plurality of compensated grayscale values corresponding to a plurality of previous grayscale values and a plurality of current grayscale values; and identify a compensated grayscale value corresponding to the grayscale information of the current frame and the stored grayscale information of the previous frame, and generate the PWM signal based on the identified grayscale value.

5. The display apparatus of claim 4, wherein the at least one memory is further configured to store a plurality of look-up tables for each image mode, and wherein the at least one processor is further configured to obtain the compensated grayscale value using a look-up table corresponding to a current image mode.

6. The display apparatus of claim 4, wherein the look-up table is a table in which the compensated grayscale value comprises a lower compensated grayscale value that is lower than a current grayscale value based on a previous grayscale value being a high grayscale value, and a lower current grayscale value being a low grayscale value lower than the high grayscale value.

7. The display apparatus of claim 4, wherein the look-up table is a table in which the compensated grayscale value comprises a higher compensated grayscale value that is higher than a current grayscale value based on a previous grayscale value being a low grayscale value, and a higher current grayscale value being a high grayscale value higher than the low grayscale value.

8. An operating method of a display apparatus including a plurality of light emitting devices (LEDs) that form a plurality of sub pixels, the operating method comprising:

storing previous grayscale information of a previous frame;

determining, based on whether a change in brightness information is linearly deformed or includes a non-linear change characteristic, a compensation method from among a plurality of compensation methods comprises at least one of a calculation method or a look-up table method;

performing a compensation of grayscale information of a current frame based on the determined compensation method, wherein the PWM signal is generated based on the compensated grayscale information;

based on the compensated grayscale information, generating a pulse width modulation (PWM) signal; and driving the plurality of LEDs by providing driving current based on the PWM signal to the plurality of LEDs in a light emitting period, wherein the grayscale information is the brightness information of a first sub pixel of the current frame and the brightness information does not include a second sub pixel of the current frame, wherein the generating the PWM signal comprises, based on the brightness information of the first sub pixel of the current frame being received, compensating the received brightness information of the first sub pixel of the current frame based on a stored brightness information of the first sub pixel of the previous frame, and wherein the generating the PWM signal further comprises, based on the first sub pixel of the previous frame having a lower grayscale value than a grayscale value of the first subpixel of the current frame for each grayscale value of the first subpixel of the current frame comprising grayscale values of 16, 32, 64, 128, and 256, compensate the received brightness information to have a higher grayscale value than the grayscale value of the first subpixel of the current frame for each grayscale value of the first subpixel of the current frame, providing a duty value of the current frame to be a longer duty value than the duty value of the previous frame, and generating the PWM signal based on the compensated brightness information.

9. The operating method of claim 8, wherein the grayscale information is pulse width information corresponding to the PWM signal, and wherein the generating the PWM signal comprises, based on pulse width information of the current frame being received, compensating the received pulse width information of the current frame based on the stored pulse width information of the previous frame, and generating the PWM signal based on the compensated pulse width information.

10. The operating method of claim 8, wherein the generating the PWM signal comprises accessing a look-up table, the look-up table comprising a plurality of compensated grayscale values corresponding to a plurality of previous grayscale values and a plurality of current grayscale values, identifying a compensated grayscale value corresponding to the grayscale information of the current frame and the stored grayscale information of the previous frame, and generating the PWM signal based on the identified grayscale value.

11. The operating method of claim 10, wherein the generating the PWM signal comprises accessing a look-up table, from among a plurality of look-up tables for each image mode, corresponding to a current image mode, and identifying the compensated grayscale value.

12. The operating method of claim 10, wherein the look-up table is a table in which the compensated grayscale value comprises a lower compensated grayscale value that is lower than a current grayscale value based on a previous grayscale value being a high grayscale value, and a lower current grayscale value being a low grayscale value lower than the high grayscale value.

13. The operating method of claim 10, wherein the look-up table is a table in which the compensated grayscale value comprises a higher compensated grayscale value that is higher than a current grayscale value based on a previous grayscale value being a low grayscale value, and a higher current grayscale value being a high grayscale value higher than the low grayscale value.

* * * * *